UNITED STATES PATENT OFFICE.

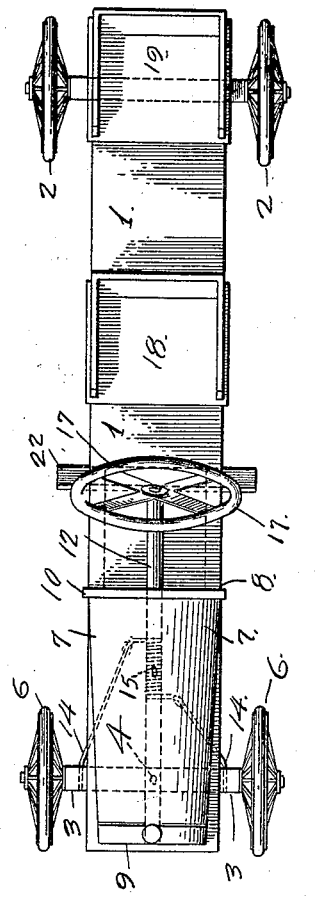
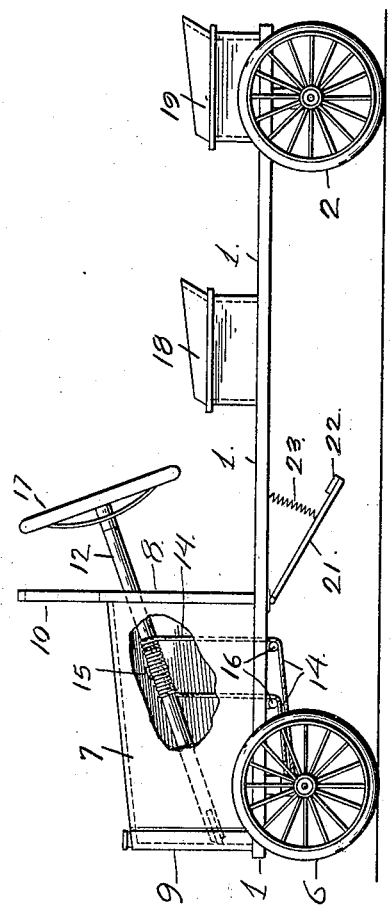
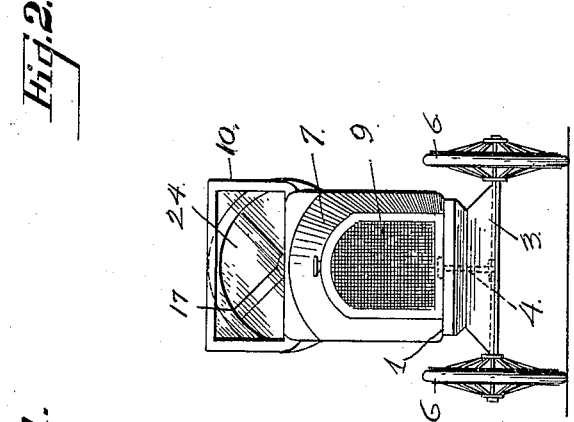

WILLIAM KIRKPATRICK AND WILLIAM WIEGNER, OF SAN FRANCISCO, CALIFORNIA.

COASTER.

1,327,240.  Specification of Letters Patent.  Patented Jan. 6, 1920.

Application filed May 13, 1919. Serial No. 298,323.

*To all whom it may concern:*

Be it known that we, WILLIAM KIRKPATRICK and WILLIAM WIEGNER, citizens of the United States, residing in the city and county of San Francisco and State of California, have invented a certain new and useful Improvement in Coasters, of which the following is a specification.

Our invention relates to improvements in coasters wherein a hood-housing and screen radiator are provided in conjunction with a steering wheel to simulate a motor vehicle.

The primary object of our invention is to provide an improved coaster having a steering wheel and mechanism similar to that of a motor vehicle, said mechanism being rotatably mounted within an imitation hood and radiator, which serves as a support for said mechanism.

Another object of the invention is to provide an improved coaster having suitable braking mechanism which may be effectively operated to control the speed of the coaster in conjunction with flexible means for normally retaining the brake in an inoperative position.

It is also an object to further simulate a motor vehicle by the provision of front and rear seats.

We accomplish these objects by means of the device disclosed in the drawings forming a part of the present specification wherein like characters of reference are used to designate similar parts throughout the said specification and drawings, and in which:

Figure 1 is a front elevation of our improved coaster;

Fig. 2 is a plan view thereof; and

Fig. 3 is a broken side elevation.

Referring to the drawings the number 1 is used to designate in general a body portion provided at the rear end thereof with two rear supporting wheels 2.

A suitable axletree 3 is pivotally mounted upon the under side of the front end of the body 1 as at 4, and is provided with two front supporting wheels 6.

A hood-housing 7 is mounted upon the front end of the body 1 and is provided with a vertically disposed rear portion 8 terminating at its upper end in a windshield 10.

The front end of the housing is provided with a screen 9 of any suitable type in simulation of a radiator.

A steering post 12 is rotatably mounted in the housing 7, being journaled in the front and rear ends thereof as disclosed in Fig. 3 of the drawings. A cord 14, or other suitable connection, is wound around the steering post 12 and secured at one portion by a staple 15 or the like to prevent movement of said cord 14 on said steering post 12. The ends of the cord 14, after passing over suitable pulleys 16, are secured to opposite ends of the axletree 3 whereby rotation of the steering post 12 will actuate the said axletree 3 to steer the vehicle.

The steering post 12 is provided at its inner end with a suitable steering wheel 17, also in simulation of a motor vehicle.

Front and rear seats 18 and 19 respectively, arranged in tandem, are provided to further simulate a motor vehicle.

A drag brake 21 is pivotally mounted to depend from the under side of the body 1 and is provided with laterally extending extensions 22 to receive the feet of an operator.

The brake 22 is provided with a spring 23 or other suitable flexible means for normally elevating said drag brake 21.

The windshield 10 may be provided with a suitable transparent element 24, such as a sheet of celluloid or other non-brittle material, in further simulation of a motor vehicle.

In operation the coaster is propelled by any manual method or by gravity, such as coasting down a hill, and its course is controlled by the steering mechanism consisting of the steering wheel 17, steering post 12, cords 14 and axletree 3.

The speed or velocity of the vehicle is controlled by the pressure of the feet of an operator sitting in the front seat 18 to move the drag brake 21 into frictional engagement with the roadway.

It is obvious from the foregoing that we have provided a new and improved coaster adapted to simulate a motor vehicle, as well as new and novel means for regulating and controlling the course as well as the speed of the vehicle.

We are aware that the present state of the art discloses coasters having steering wheels, a suitable brake, and a seat thereon. Therefore we do not claim such a combination broadly as our invention, but what we do claim is:

1. A coaster comprising a body; a pair of rear wheels mounted to support the rear end of said body; an axletree pivotally mounted under the front end of the body; a pair of wheels pivotally mounted on the axletree; a hood-housing on the front of the body; a screen secured to the front of the housing to represent a radiator; a windshield mounted upon the back of the housing; a steering post rotatably mounted in the front of the housing and the windshield; means operatively connecting the steering post and the axletree whereby the coaster may be steered; a steering wheel connected to one end of the steering post; and a drag brake pivotally mounted upon the under side of the body and having lateral extensions extending beyond the body to accommodate the feet of an operator; and flexible means for normally elevating the drag brake.

2. A coaster comprising a body; a pair of rear wheels mounted to support the rear end of said body; an axletree pivotally mounted under the front end of the body; a pair of wheels pivotally mounted on the axletree; a hood-housing on the front of the body; a screen secured to the front of the housing to represent a radiator; a windshield mounted upon the back of the housing; a steering post rotatably mounted in the front of the housing and the windshield; means operatively connecting the steering post and the axletree whereby the coaster may be steered; a steering wheel connected to one end of the steering post; a drag brake pivotally mounted upon the under side of the body and having lateral extensions extending beyond the body to accommodate the feet of an operator; and flexible means for normally elevating the drag brake; and two seats arranged tandem on the body.

In witness whereof we hereunto set our signatures.

WILLIAM KIRKPATRICK.
WILLIAM WIEGNER.